US012191584B2

(12) United States Patent
Huang

(10) Patent No.: US 12,191,584 B2
(45) Date of Patent: Jan. 7, 2025

(54) ANTENNA STRUCTURE

(71) Applicant: Wistron NeWeb Corp., Hsinchu (TW)

(72) Inventor: Chun-Lin Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 114 days.

(21) Appl. No.: 17/722,729

(22) Filed: Apr. 18, 2022

(65) Prior Publication Data

US 2022/0393355 A1 Dec. 8, 2022

(30) Foreign Application Priority Data

Jun. 7, 2021 (TW) ................................ 110120586

(51) Int. Cl.
*H01Q 9/04* (2006.01)
*H01Q 1/22* (2006.01)
*H01Q 5/35* (2015.01)

(52) U.S. Cl.
CPC ............... *H01Q 9/045* (2013.01); *H01Q 5/35* (2015.01); *H01Q 1/2291* (2013.01)

(58) Field of Classification Search
CPC .... H01Q 9/045; H01Q 1/2291; H01Q 9/0414; H01Q 5/35
See application file for complete search history.

(56) References Cited

U.S. PATENT DOCUMENTS 5,485,167 A * 1/1996 Wong .................. H01Q 21/062 343/834
6,239,750 B1 * 5/2001 Snygg ..................... H01Q 5/40 343/846
8,803,757 B2 * 8/2014 Shen .................... H01Q 9/0457 343/857
10,886,632 B2 1/2021 Hsiao et al.
11,063,372 B2 * 7/2021 Garrec ................. H01Q 21/245
2002/0173268 A1 * 11/2002 Heinzmann .......... H01Q 9/0407 455/3.05
2004/0227683 A1 * 11/2004 Caimi ...................... H01Q 9/40 343/742
2005/0206568 A1 * 9/2005 Phillips .................... H01Q 5/40 343/700 MS (Continued)

FOREIGN PATENT DOCUMENTS

TW 202017249 A 5/2020

*Primary Examiner* — Dimary S Lopez Cruz
*Assistant Examiner* — Austin M Back
(74) *Attorney, Agent, or Firm* — McClure, Qualey & Rodack, LLP

(57) ABSTRACT

An antenna structure includes a ground element, a first radiation element, a second radiation element, a dielectric substrate, a first feeding element, a second feeding element, a third feeding element, and a fourth radiation element. The dielectric substrate has a first surface and a second surface. The first radiation element is disposed on the first surface. The second radiation element is adjacent to the first radiation element, and is separate from the first radiation element. The first feeding element has a first feeding port, and is coupled to the first radiation element. The second feeding element has a second feeding port, and is coupled to the first radiation element. The third feeding element has a third feeding port, and is coupled to the first radiation element. The fourth feeding element has a fourth feeding port, and is coupled to the first radiation element.

15 Claims, 6 Drawing Sheets

(56) References Cited

U.S. PATENT DOCUMENTS

| | | | | |
|---|---|---|---|---|
| 2006/0232489 | A1* | 10/2006 | Bisiules | H01Q 21/28 343/797 |
| 2011/0025574 | A1* | 2/2011 | Tiezzi | H01Q 9/0457 343/824 |
| 2018/0060624 | A1* | 3/2018 | Cohen | H01Q 15/0093 |
| 2021/0175638 | A1* | 6/2021 | Povalac | G01S 3/043 |
| 2023/0231321 | A1* | 7/2023 | Choi | H01Q 5/378 343/893 |

* cited by examiner

ANTENNA STRUCTURE

CROSS REFERENCE TO RELATED APPLICATIONS

This application claims priority of Taiwan Patent Application No. 110120586 filed on Jun. 7, 2021, the entirety of which is incorporated by reference herein.

BACKGROUND OF THE INVENTION

Field of the Invention

The disclosure generally relates to an antenna structure, and more particularly, to a multi-feed antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Wireless access points are indispensable elements for mobile devices in a room to connect to the Internet at a high speed. However, since an indoor environment can experience serious signal reflection and multipath fading, wireless access points should process signals from a variety of directions of transmission and polarization simultaneously. Accordingly, it has become a critical challenge for current designers to design a wideband antenna with multiple polarization directions in the limited space of a wireless access point.

BRIEF SUMMARY OF THE INVENTION

In an exemplary embodiment, the invention is directed to an antenna structure that includes a ground element, a first radiation element, a second radiation element, a dielectric substrate, a first feeding element, a second feeding element, a third feeding element, and a fourth feeding element. The dielectric substrate has a first surface and a second surface which are opposite to each other. The first radiation element is disposed on the first surface. The ground element is disposed on the second surface. The second radiation element is adjacent to the first radiation element, and is separated from the first radiation element. The first feeding element has a first feeding port, and is coupled to the first radiation element. The second feeding element has a second feeding port, and is coupled to the first radiation element. The third feeding element has a third feeding port, and is coupled to the first radiation element. The fourth feeding element has a fourth feeding port, and is coupled to the first radiation element. The antenna structure covers an operational frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
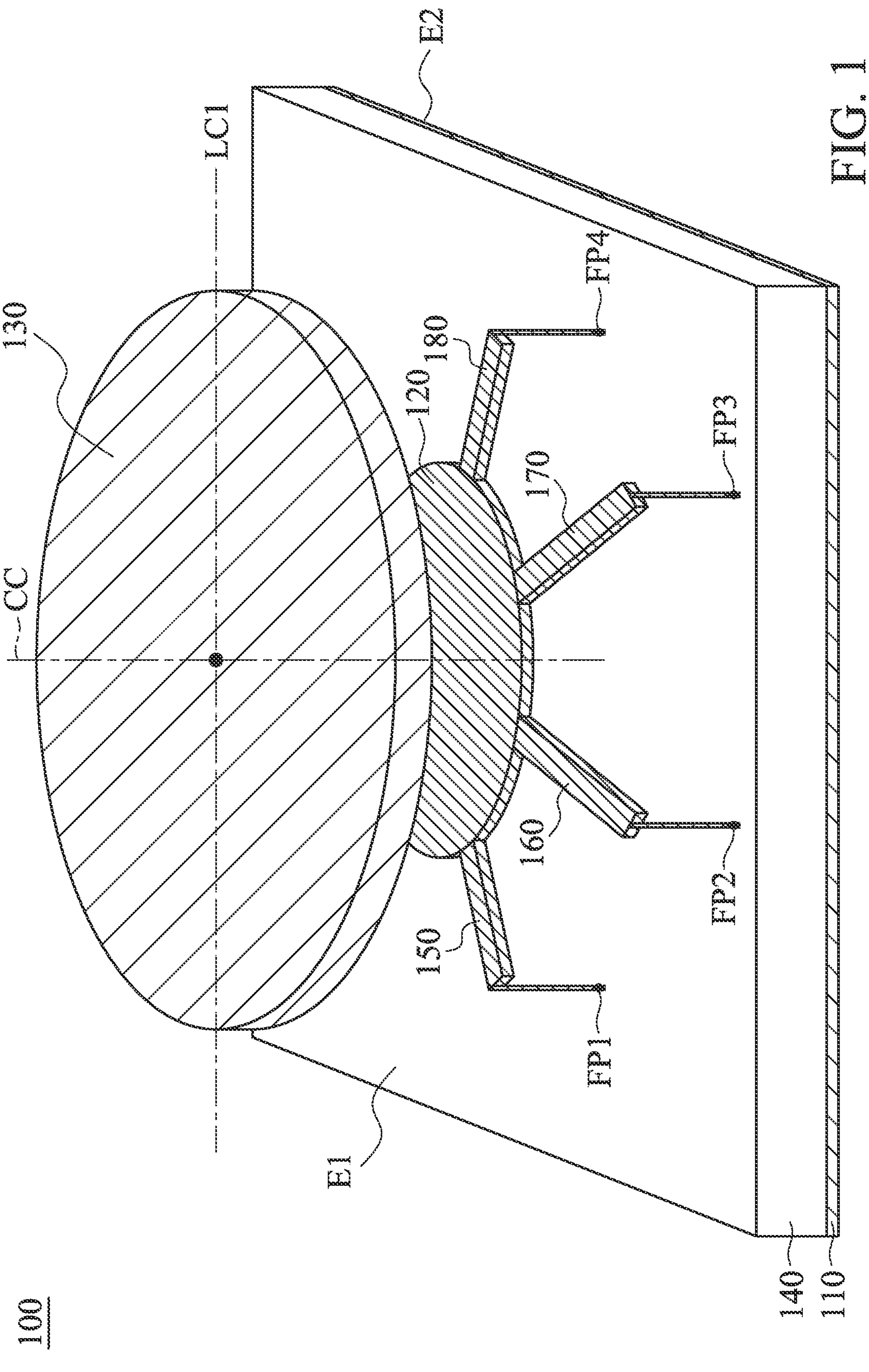
FIG. 1 is a perspective view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
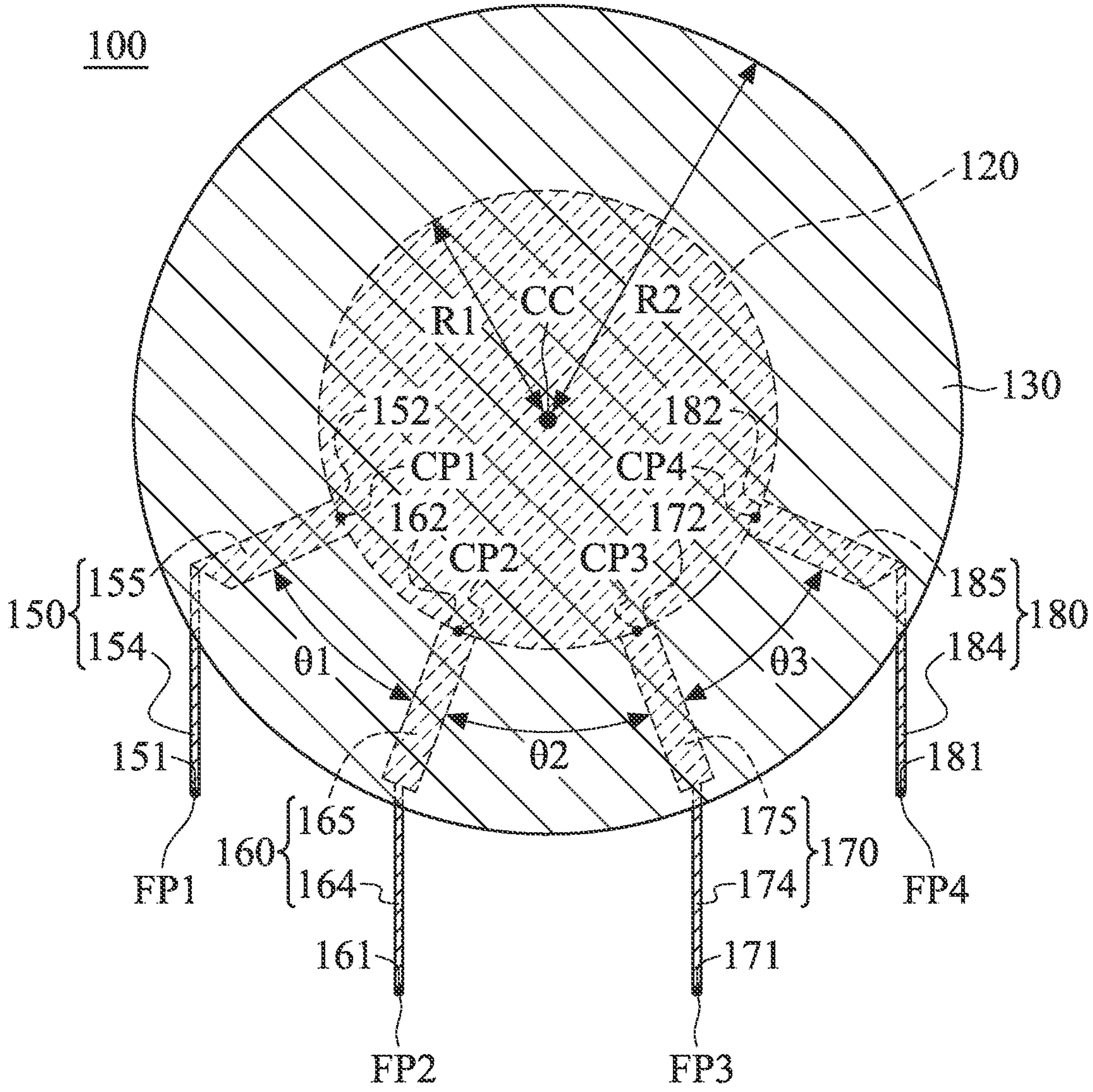
FIG. 2 is a see-through view of an antenna structure according to an embodiment of the invention.
Figure 3:
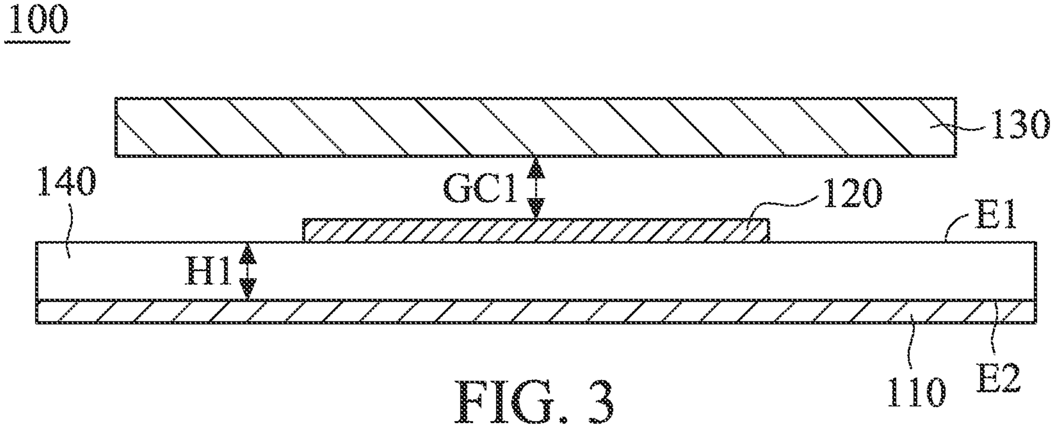
FIG. 3 is a sectional view of an antenna structure according to an embodiment of the invention.

FIG. 1 is a perspective view of an antenna structure 100 according to an embodiment of the invention. For example, the antenna structure 100 may be applied to a wireless access point, but it is not limited thereto. As shown in FIG. 1, the antenna structure 100 includes a ground element 110, a first radiation element 120, a second radiation element 130, a dielectric substrate 140, a first feeding element 150, a second feeding element 160, a third feeding element 170, and a fourth feeding element 180. The ground element 110, the first radiation element 120, the second radiation element 130, the first feeding element 150, the second feeding element 160, the third feeding element 170, and the fourth feeding element 180 may all be made of metal materials, such as copper, silver, aluminum, iron, or their alloys. FIG. 2 is a see-through view of the antenna structure 100 according to an embodiment of the invention (to simplify the figure, the ground element 110 and the dielectric substrate 140 are omitted and not shown). FIG. 3 is a sectional view of the antenna structure 100 according to an embodiment of the invention (along a sectional line LC1 of FIG. 1). Please refer to FIG. 1, FIG. 2 and FIG. 3 together to understand the invention.

The ground element 110 provides a ground voltage. The first radiation element 120 may substantially have a circular shape. The dielectric substrate 140 may be an FR4 (Flame Retardant 4) substrate, a PCB (Printed Circuit Board), or an FPC (Flexible Printed Circuit Board). The dielectric substrate 140 has a first surface E1 and a second surface E2 which are opposite to each other. The first radiation element 120 is disposed on the first surface E1 of the dielectric substrate 140. The ground element 110 is disposed on the second surface E2 of the dielectric substrate 140. The area of the ground element 110 may be much greater than the area of the first radiation element 120.

The second radiation element 130 may substantially have another circular shape (a larger circular shape). The area of the second radiation element 130 may be greater than the area of the first radiation element 120. The second radiation element 130 shares the same center axis CC with the first radiation element 120. The center axis CC may be substantially perpendicular to the first surface E1 of the dielectric substrate 140. That is, the center of the second radiation element 130 may overlap the center of the first radiation element 120. The center axis CC may pass through the aforementioned two centers of circles. The second radiation element 130 is disposed adjacent to the first radiation element 120, and is completely separated from the first radiation element 120. In other words, the second radiation element 130 is floating. It should be noted that the term “adjacent” or “close” over the disclosure means that the distance (spacing) between two corresponding elements is smaller than a predetermined distance (e.g., 5 mm or the shorter), but it often does not mean that the two corresponding elements touch each other directly (i.e., the aforementioned distance/spacing therebetween is reduced to 0). In some embodiments, the second radiation element 130 is substantially parallel to the first radiation element 120, and a coupling gap GC1 is formed between the second radiation element 130 and the first radiation element 120. In addition, if the second radiation element 130 has a vertical projection on the first surface E1 of the dielectric substrate 140, the whole first radiation element 120 will be inside the vertical projection of the second radiation element 130.

The first feeding element 150, the second feeding element 160, the third feeding element 170, and the fourth feeding element 180 are all disposed on the first surface E1 of the dielectric substrate 140. These feeding elements and the first radiation element 120 may be coplanar. For example, each of the first feeding element 150, the second feeding element 160, the third feeding element 170, and the fourth feeding element 180 may substantially have a polyline shape, a straight-line shape, or a meandering shape, but it is not limited thereto.

The first feeding element 150 has a first end 151 and a second end 152. A first feeding port FP1 is positioned at the first end 151 of the first feeding element 150. The second end 152 of the first feeding element 150 is coupled to a first connection point CP1 on the first radiation element 120. The second feeding element 160 has a first end 161 and a second end 162. A second feeding port FP2 is positioned at the first end 161 of the second feeding element 160. The second end 162 of the second feeding element 160 is coupled to a second connection point CP2 on the first radiation element 120. The third feeding element 170 has a first end 171 and a second end 172. A third feeding port FP3 is positioned at the first end 171 of the third feeding element 170. The second end 172 of the third feeding element 170 is coupled to a third connection point CP3 on the first radiation element 120. The fourth feeding element 180 has a first end 181 and a second end 182. A fourth feeding port FP4 is positioned at the first end 181 of the fourth feeding element 180. The second end 182 of the fourth feeding element 180 is coupled to a fourth connection point CP4 on the first radiation element 120. The first connection point CP1, the second connection point CP2, the third connection point CP3, and the fourth connection point CP4 are different from each other, and they may be all arranged on the circumference of the first radiation element 120. In some embodiments, the first feeding element 150, the second feeding element 160, the third feeding element 170 and the fourth feeding element 180 are substantially the same length, so as to provide almost the same phase delay.

In some embodiments, the first feeding element 150, the second feeding element 160, the third feeding element 170, and the fourth feeding element 180 are variable-width structures. Specifically, the first feeding element 150 includes a first narrow portion 154 and a first wide portion 155. The first feeding port FP1 is coupled through the first narrow portion 154 and the first wide portion 155 to the first connection point CP1. The second feeding element 160 includes a second narrow portion 164 and a second wide portion 165. The second feeding port FP2 is coupled through the second narrow portion 164 and the second wide portion 165 to the second connection point CP2. The third feeding element 170 includes a third narrow portion 174 and a third wide portion 175. The third feeding port FP3 is coupled through the third narrow portion 174 and the third wide portion 175 to the third connection point CP3. The fourth feeding element 180 includes a fourth narrow portion 184 and a fourth wide portion 185. The fourth feeding port FP4 is coupled through the fourth narrow portion 184 and the fourth wide portion 185 to the fourth connection point CP4. According to practical measurements, such a variable-width design can fine-tune the feeding impedance of the antenna structure 100. However, the invention is not limited thereto. In alternative embodiments, adjustments are made such that the first feeding element 150, the second feeding element 160, the third feeding element 170, and the fourth feeding element 180 are equal-width structures. In other embodiments, adjustments are made such that the first feeding element 150, the second feeding element 160, the third feeding element 170, and the fourth feeding element 180 are multi-segment structures (e.g., more than two segments, any two of which are not parallel to each other) or taper-width structures.

A first angle θ1 is formed between the second wide portion 165 of the second feeding element 160 and the first wide portion 155 of the first feeding element 150. A second angle θ2 is formed between the third wide portion 175 of the third feeding element 170 and the second wide portion 165 of the second feeding element 160. A third angle θ3 is formed between the fourth wide portion 185 of the fourth feeding element 180 and the third wide portion 175 of the third feeding element 170. For example, the extension line of each of the first wide portion 155, the second wide portion 165, the third wide portion 175, and the fourth wide portion 185 can pass through the center axis CC. In some embodiments, the first angle θ1, the second angle θ2, and the third angle θ3 are substantially equal to each other. In alternative embodiments, the first angle θ1 is defined between the second connection point CP2 and the first connection point CP1, the second angle θ2 is defined between the third connection point CP3 and the second connection point CP2, and the third angle θ3 is defined between the fourth connection point CP4 and the third connection point CP3. For example, two sides of the corresponding angle can be defined by connecting any two adjacent connection points to the center axis CC, respectively, but they are not limited thereto.

In some embodiments, the antenna structure 100 can covers an operational frequency band from 2400 MHz to 2500 MHz, and its operational principles will be described as follows. The feeding energy from a signal source (not shown) can be entered via any two of the first feeding port FP1, the second feeding port FP2, the third feeding port FP3 and the fourth feeding port FP4, so as to excite the antenna structure 100. The second radiation element 130 can be excited by the first radiation element 120 using a coupling mechanism, so as to enhance the radiation pattern of the antenna structure 100. With such a design, the antenna structure 100 can support at least the wideband operation of WLAN (Wireless Local Area Network) 2.4 GHz.

In some embodiments, the antenna structure 100 operates in either a first mode or a second mode, so as to provide different polarization directions. In the first mode, the first feeding port FP1 and the third feeding port FP3 are both enabled (or in use), and the second feeding port FP2 and the fourth feeding port FP4 are both disabled (or not in use), where a first feeding phase difference is provided between the first feeding port FP1 and the third feeding port FP3. In the second mode, the second feeding port FP2 and the fourth feeding port FP4 are both enabled, and the first feeding port FP1 and the third feeding port FP3 are both disabled, where a second feeding phase difference is provided between the second feeding port FP2 and the fourth feeding port FP4. For example, each of the first feeding phase difference and the second feeding phase difference may be equal to 0, 45, 90, 135 or 180 degrees, but it is not limited thereto. The antenna structure 100 can provide a variety of polarization directions by appropriately selecting the feeding ports and the feeding phase difference therebetween.

In some embodiments, the element sizes of the antenna structure 100 will be described as follows. The radius R1 of the first radiation element 120 may be substantially equal to 0.25 guided wavelength (i.e., λg/4, where "guided wavelength λg" is defined in the dielectric substrate 140 and is adjustable according to the dielectric constant of the dielectric substrate 140) of the operational frequency band of the antenna structure 100. The radius R2 of the second radiation element 130 may be substantially equal to 0.25 free-space wavelength (i.e., λf/4, where "free-space wavelength λf" is defined in free space) of the operational frequency band of the antenna structure 100. For example, the radius R2 of the second radiation element 130 may be substantially two times the radius R1 of the first radiation element 120. The width of the coupling gap GC1 between the second radiation element 130 and the first radiation element 120 may be substantially equal to 0.05 free-space wavelength (i.e., λf/20) of the operational frequency band of the antenna structure 100. The thickness H1 of the dielectric substrate 140 may be from 0.4 mm to 1.6 mm. The dielectric constant of the dielectric substrate 140 may be from 2 to 16. The first angle θ1 between the second wide portion 165 of the second feeding element 160 and the first wide portion 155 of the first feeding element 150 may be substantially equal to 45 degrees. The second angle θ2 between the third wide portion 175 of the third feeding element 170 and the second wide portion 165 of the second feeding element 160 may be substantially equal to 45 degrees. The third angle θ3 between the fourth wide portion 185 of the fourth feeding element 180 and the third wide portion 175 of the third feeding element 170 may be substantially equal to 45 degrees. The above ranges of element sizes are calculated and obtained according to many experiment results, and they help to optimize the tunable polarization, operational bandwidth and impedance matching of the antenna structure 100.

Figure 4:
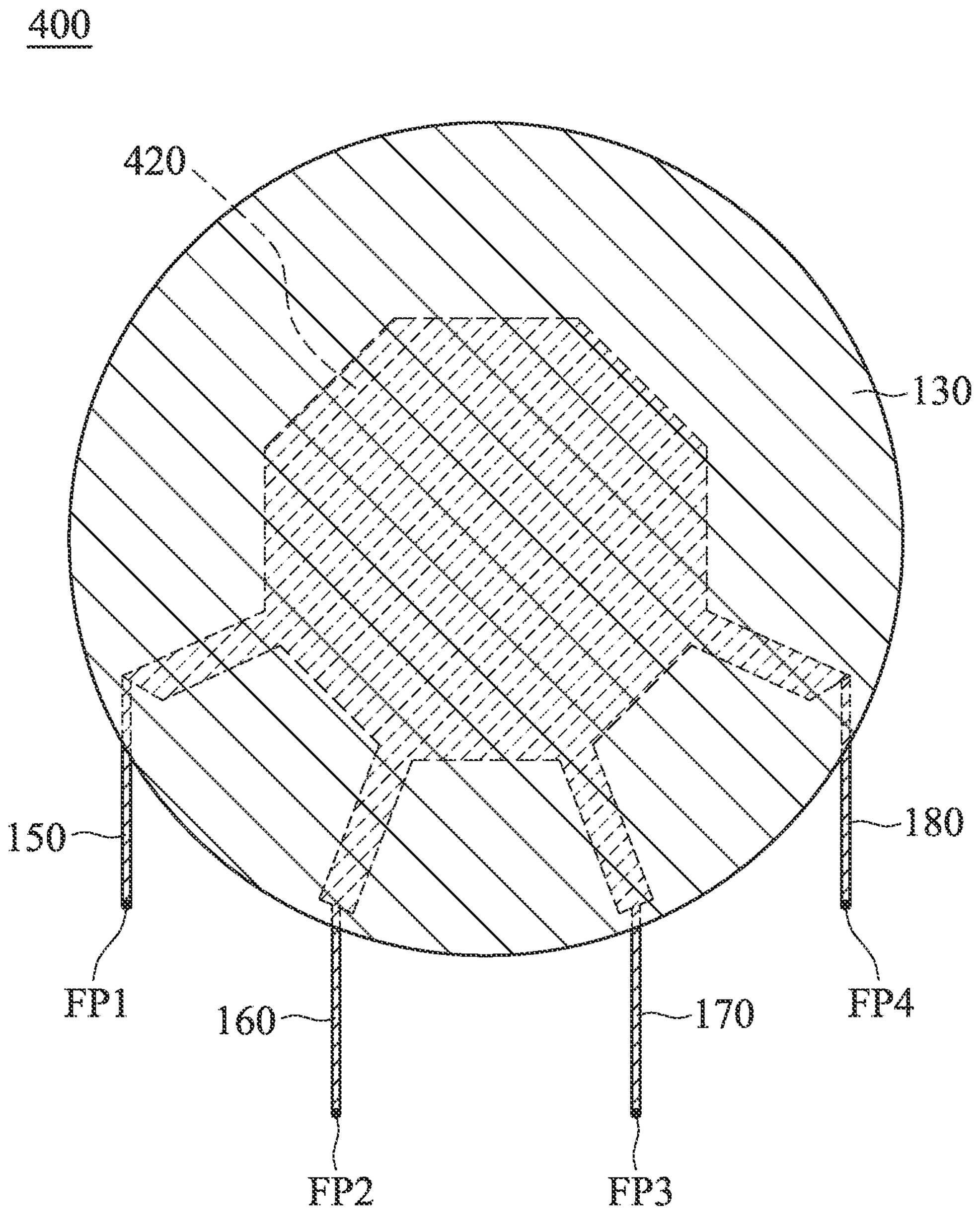
FIG. 4 is a see-through view of an antenna structure according to an embodiment of the invention.

FIG. 4 is a see-through view of the antenna structure 400 according to an embodiment of the invention (to simplify the figure, the ground element 110 and the dielectric substrate 140 are omitted and not shown). FIG. 4 is similar to FIG. 2. In the embodiment of FIG. 4, a first radiation element 420 of the antenna structure 400 substantially has a regular octagonal shape. In alternative embodiments, the first radiation element 420 substantially has a regular polygon with N sides, where "N" may be a multiple of 8 or any integer greater than or equal to 16. According to practical measurements, the different shape of the first radiation element 420 can fine-tune the impedance matching of the antenna structure 400. Other features of the antenna structure 400 of FIG. 4 are similar to those of the antenna structure 100 of FIG. 1, FIG. 2 and FIG. 3. Thus, the two embodiments can achieve similar levels of performance.

Figure 5:
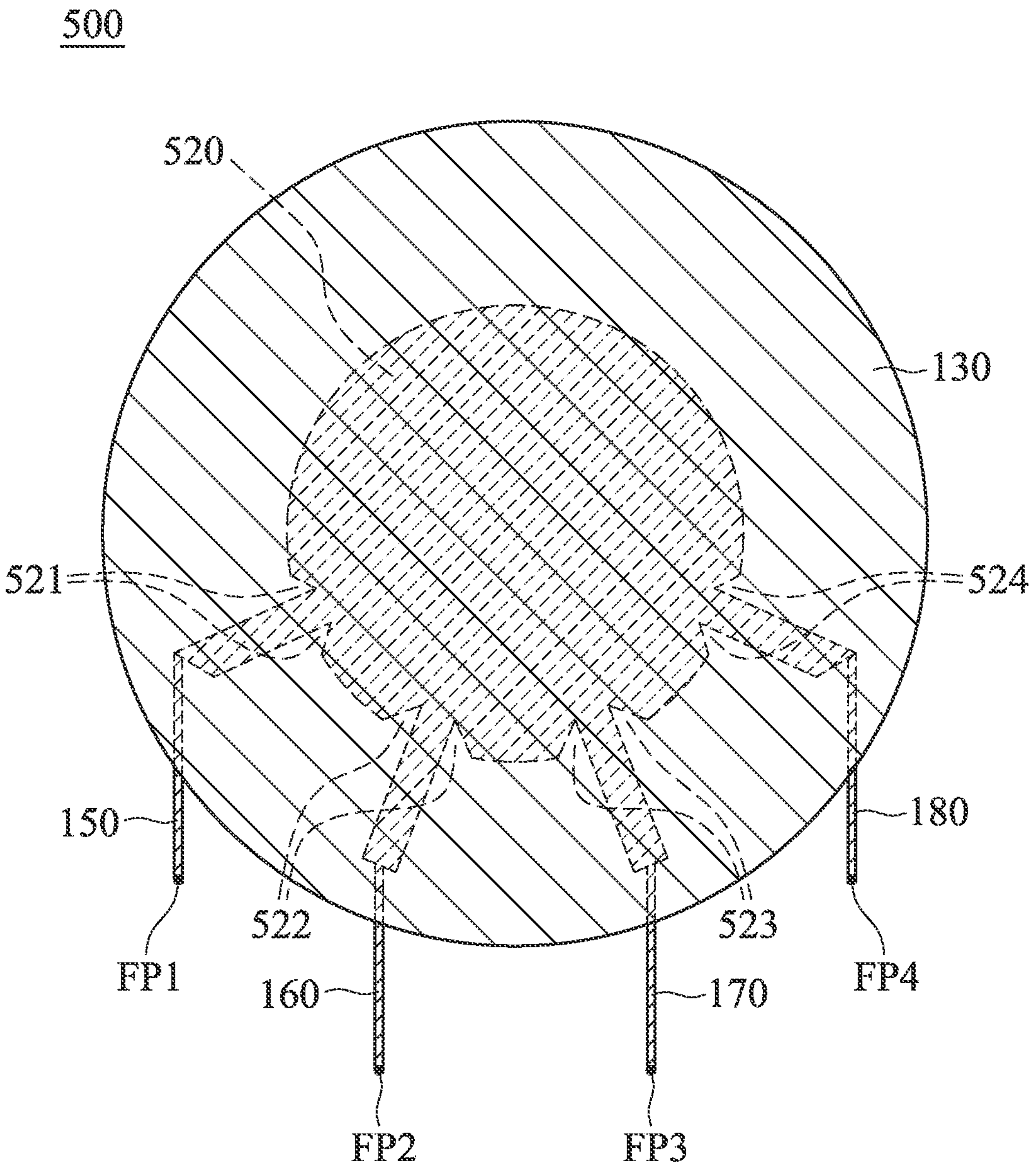
FIG. 5 is a see-through view of an antenna structure according to an embodiment of the invention.

FIG. 5 is a see-through view of the antenna structure 500 according to an embodiment of the invention (to simplify the figure, the ground element 110 and the dielectric substrate 140 are omitted and not shown). FIG. 5 is similar to FIG. 2. In the embodiment of FIG. 5, a first radiation element 520 of the antenna structure 500 further has a first notch 521, a second notch 522, a third notch 523 and a fourth notch 524 which correspond to the first feeding element 150, the second feeding element 160, the third feeding element 170 and the fourth feeding element 180, respectively. For example, each of the first notch 521, the second notch 522, the third notch 523 and the fourth notch 524 may substantially have a triangular shape, but it is not limited thereto. According to practical measurements, the incorporation of the first notch 521, the second notch 522, the third notch 523 and the fourth notch 524 can fine-tune the impedance matching of the antenna structure 500. Other features of the antenna structure 500 of FIG. 5 are similar to those of the antenna structure 100 of FIG. 1, FIG. 2 and FIG. 3. Thus, the two embodiments can achieve similar levels of performance.

Figure 6:
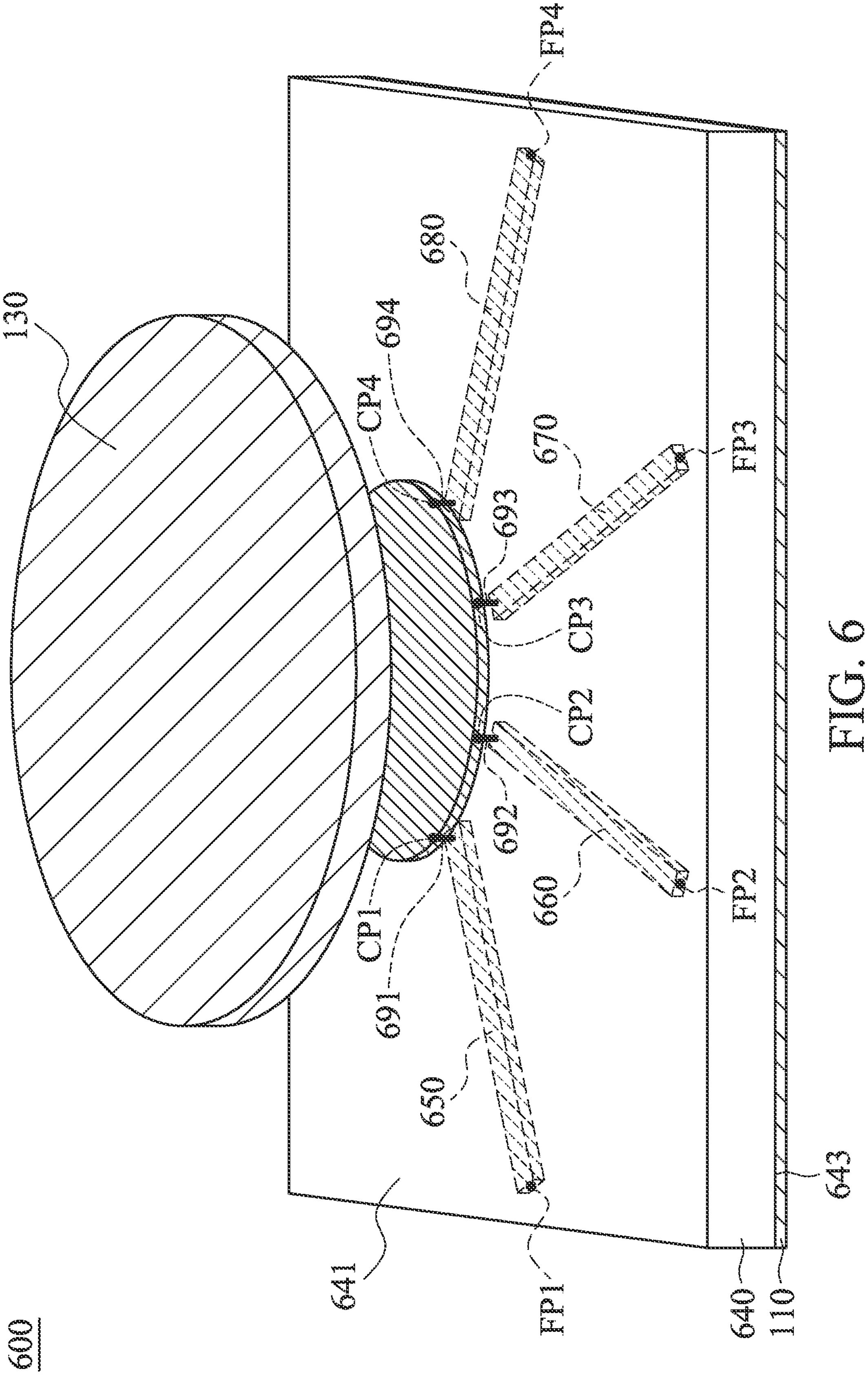
FIG. 6 is a perspective view of an antenna structure according to an embodiment of the invention.
Figure 7:
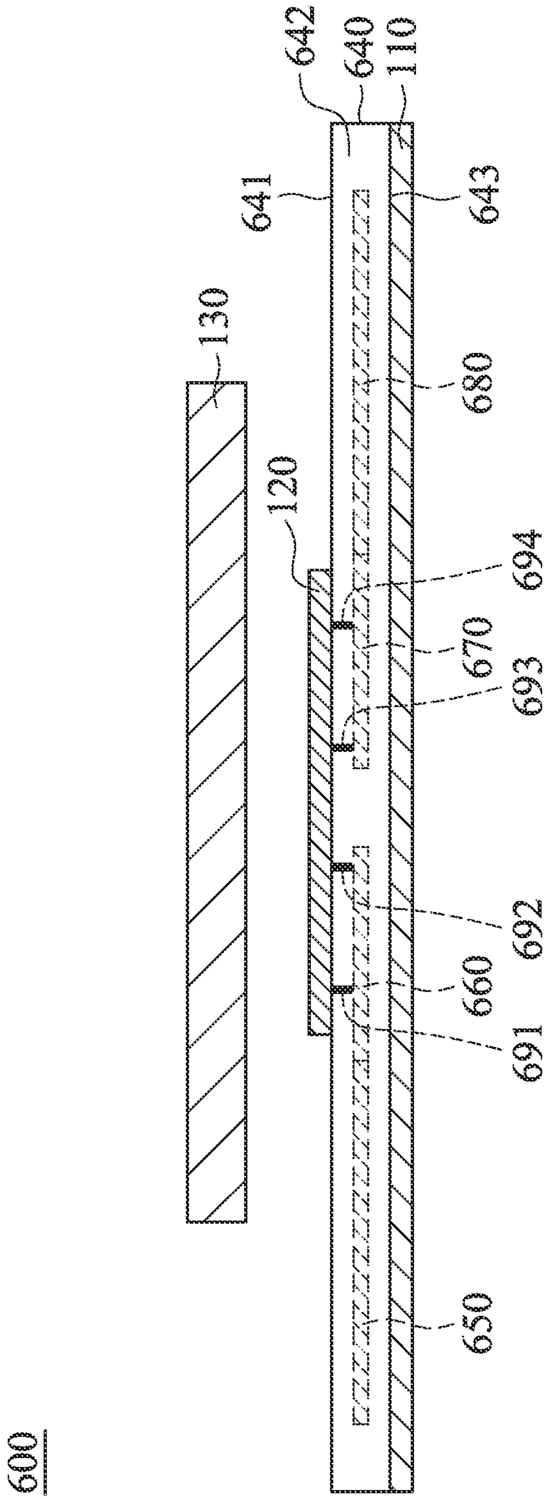
FIG. 7 is a side view of an antenna structure 600 according to an embodiment of the invention.

FIG. 6 is a perspective view of an antenna structure 600 according to an embodiment of the invention. FIG. 7 is a side view of the antenna structure 600 according to an embodiment of the invention. FIG. 6 and FIG. 7 are similar to FIG. 1 and FIG. 3. In the embodiment of FIG. 6 and FIG. 7, a dielectric substrate 640 of the antenna structure 600 is a three-layer circuit board with a top layer 641, a middle layer 642 and a bottom layer 643. The antenna structure 600 further includes a first conductive via element 691, a second conductive via element 692, a third conductive via element 693 and a fourth conductive via element 694. The first conductive via element 691, the second conductive via element 692, the third conductive via element 693, and the fourth conductive via element 694 at least partially penetrate the dielectric substrate 640. In addition, a first feeding element 650, a second feeding element 660, a third feeding element 670, and a fourth feeding element 680 of the antenna structure 600 are all disposed in the middle layer 642 of the dielectric substrate 640, and are all between the first radiation element 120 and the ground element 110. The first conductive via element 691 is coupled between the first feeding element 650 and a first connection point CP1 on the first radiation element 120. The second conductive via element 692 is coupled between the second feeding element 660 and a second connection point CP2 on the first radiation element 120. The third conductive via element 693 is coupled between the third feeding element 670 and a third connection point CP3 on the first radiation element 120. The fourth conductive via element 694 is coupled between the fourth feeding element 680 and a fourth connection point CP4 on the first radiation element 120. Such a design of embedding all of the feeding elements and conductive via elements into the dielectric substrate 640 can increase the integrity and manufacturing flexibility of the antenna structure 600. Other features of the antenna structure 600 of FIG. 6 and FIG. 7 are similar to those of the antenna structure 100 of FIG. 1, FIG. 2 and FIG. 3. Thus, the two embodiments can achieve similar levels of performance.

The invention proposes a novel antenna structure. In comparison to the conventional design, the invention has at least the advantages of multiple polarizations, small size, wide bandwidth, and low manufacturing cost. Therefore, the invention is suitable for application in a variety of communication devices.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-7. The invention may merely include any one or more features of any one or more embodiments of FIGS. 1-7. In other words, not all of the features displayed in the figures should be implemented in the antenna structure of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a ground element;

a first radiation element;

a dielectric substrate, having a first surface and a second surface opposite to each other, wherein the first radiation element is disposed on the first surface, and the ground element is disposed on the second surface;

a second radiation element, disposed adjacent to the first radiation element, and separated from the first radiation element;

a first feeding element, having a first feeding port, and coupled to the first radiation element;

a second feeding element, having a second feeding port, and coupled to the first radiation element;

a third feeding element, having a third feeding port, and coupled to the first radiation element; and a fourth feeding element, having a fourth feeding port, and coupled to the first radiation element;

wherein the antenna structure covers an operational frequency band;

wherein the second radiation element is substantially parallel to the first radiation element, and a coupling gap is formed between the second radiation element and the first radiation element;

wherein a width of the coupling gap is substantially equal to 0.05 free-space wavelength of the operational frequency band;

wherein each of the first radiation element and the second radiation element substantially has a solid circular shape;

wherein the antenna structure operates in a first mode or a second mode, so as to provide different polarization directions;

wherein in the first mode, the first feeding port and the third feeding port are enabled, the second feeding port and the fourth feeding port are disabled, and a first feeding phase difference is provided between the first feeding port and the third feeding port.

2. The antenna structure as claimed in claim 1, wherein the operational frequency band is from 2400 MHz to 2500 MHz.

3. The antenna structure as claimed in claim 1, wherein a radius of the first radiation element is substantially equal to 0.25 guided wavelength of the operational frequency band.

4. The antenna structure as claimed in claim 1, wherein the first radiation element further has a first notch, a second notch, a third notch and a fourth notch corresponding to the first feeding element, the second feeding element, the third feeding element and the fourth feeding element, respectively.

5. The antenna structure as claimed in claim 1, wherein an area of the second radiation element is greater than an area of the first radiation element.

6. The antenna structure as claimed in claim 5, wherein a radius of the second radiation element is substantially equal to 0.25 free-space wavelength of the operational frequency band.

7. The antenna structure as claimed in claim 1, wherein the first feeding element, the second feeding element, the third feeding element and the fourth feeding element are substantially the same length.

8. The antenna structure as claimed in claim 1, wherein the first feeding element comprises a first narrow portion and a first wide portion, the first feeding port is coupled through the first narrow portion and the first wide portion to a first connection point on the first radiation element, the second feeding element comprises a second narrow portion and a second wide portion, the second feeding port is coupled through the second narrow portion and the second wide portion to a second connection point on the first radiation element, the third feeding element comprises a third narrow portion and a third wide portion, the third feeding port is coupled through the third narrow portion and the third wide portion to a third connection point on the first radiation element, the fourth feeding element comprises a fourth narrow portion and a fourth wide portion, and the fourth feeding port is coupled through the fourth narrow portion and the fourth wide portion to a fourth connection point on the first radiation element.

9. The antenna structure as claimed in claim 8, wherein a first angle is formed between the second wide portion and the first wide portion, a second angle is formed between the third wide portion and the second wide portion, and a third angle is formed between the fourth wide portion and the third wide portion.

10. An antenna structure, comprising:

a ground element;

a first radiation element;

a dielectric substrate, having a first surface and a second surface opposite to each other, wherein the first radiation element is disposed on the first surface, and the ground element is disposed on the second surface;

a second radiation element, disposed adjacent to the first radiation element, and separated from the first radiation element;

a first feeding element, having a first feeding port, and coupled to the first radiation element;

a second feeding element, having a second feeding port, and coupled to the first radiation element;

a third feeding element, having a third feeding port, and coupled to the first radiation element; and a fourth feeding element, having a fourth feeding port, and coupled to the first radiation element;

wherein the antenna structure covers an operational frequency band;

wherein the first feeding element comprises a first wide portion coupled to a first connection point on the first radiation element, the second feeding element comprises a second wide portion coupled to a second connection point on the first radiation element, the third feeding element comprises a third wide portion coupled to a third connection point on the first radiation element, and the fourth feeding element comprises a fourth wide portion coupled to a fourth connection point on the first radiation element;

wherein a first angle is formed between the second wide portion and the first wide portion, a second angle is formed between the third wide portion and the second wide portion, and a third angle is formed between the fourth wide portion and the third wide portion;

wherein the first angle, the second angle, and the third angle are substantially equal to 45 degrees;

wherein the antenna structure operates in a first mode or a second mode, so as to provide different polarization directions;

wherein in the first mode, the first feeding port and the third feeding port are enabled, the second feeding port and the fourth feeding port are disabled, and a first feeding phase difference is provided between the first feeding port and the third feeding port.

11. The antenna structure as claimed in claim 1, further comprising:

a first conductive via element, coupled between the first feeding element and a first connection point on the first radiation element;

a second conductive via element, coupled between the second feeding element and a second connection point on the first radiation element;

a third conductive via element, coupled between the third feeding element and a third connection point on the first radiation element; and a fourth conductive via element, coupled between the fourth feeding element and a fourth connection point on the first radiation element.

12. The antenna structure as claimed in claim 11, wherein the first conductive via element, the second conductive via element, the third conductive via element, and the fourth conductive via element all at least partially penetrate the dielectric substrate.

13. The antenna structure as claimed in claim 11, wherein the first feeding element, the second feeding element, the third feeding element, and the fourth feeding element are all disposed between the first radiation element and the ground element.

14. The antenna structure as claimed in claim 1, wherein in the second mode, the second feeding port and the fourth feeding port are enabled, the first feeding port and the third feeding port are disabled, and a second feeding phase difference is provided between the second feeding port and the fourth feeding port.

15. An antenna structure, comprising:

a ground element;

a first radiation element;

a dielectric substrate, having a first surface and a second surface opposite to each other, wherein the first radiation element is disposed on the first surface, and the ground element is disposed on the second surface;

a second radiation element, disposed adjacent to the first radiation element, and separated from the first radiation element;

a first feeding element, having a first feeding port, and coupled to the first radiation element;

a second feeding element, having a second feeding port, and coupled to the first radiation element;

a third feeding element, having a third feeding port, and coupled to the first radiation element; and a fourth feeding element, having a fourth feeding port, and coupled to the first radiation element;

wherein the antenna structure covers an operational frequency band;

wherein the first radiation element substantially has a regular polygon with N sides, and N is a multiple of 8;

wherein the antenna structure operates in a first mode or a second mode, so as to provide different polarization directions;

wherein in the first mode, the first feeding port and the third feeding port are enabled, the second feeding port and the fourth feeding port are disabled, and a first feeding phase difference is provided between the first feeding port and the third feeding port.

* * * * *